United States Patent [19]
Okuno et al.

[11] 3,962,710
[45] June 8, 1976

[54] VIEWFINDER FOR A SINGLE LENS REFLEX CAMERA

[75] Inventors: Youichi Okuno, Yokohama; Hideo Yokota, Tokyo, both of Japan

[73] Assignee: Canon Kabushiki Kaisha, Japan

[22] Filed: Nov. 1, 1974

[21] Appl. No.: 520,132

[30] Foreign Application Priority Data
Nov. 7, 1973  Japan .............................. 48128850

[52] U.S. Cl. ................................ 354/225; 354/155
[51] Int. Cl.² .................................... G03B 13/02
[58] Field of Search ............. 354/155, 224, 225, 54, 354/219

[56] References Cited
UNITED STATES PATENTS

| | | | |
|---|---|---|---|
| 3,524,380 | 8/1970 | Yamada et al. | 354/224 |
| 3,675,558 | 7/1972 | Kuramoto et al. | 354/155 |
| 3,687,038 | 8/1972 | Kawakomi | 354/155 |
| 3,757,656 | 10/1973 | Kuramoto | 354/225 |
| 3,800,655 | 4/1974 | Uchida | 354/225 |

FOREIGN PATENTS OR APPLICATIONS

| | | | |
|---|---|---|---|
| 1,095,762 | 12/1967 | United Kingdom | 354/225 |

*Primary Examiner*—L. T. Hix
*Assistant Examiner*—E. M. O'Connor
*Attorney, Agent, or Firm*—McGlew and Tuttle

[57] ABSTRACT

The viewfinder includes a pentagonal roof prism having a front non-reflecting surface and a rear light exit surface adjacent an eyepiece. A sub-prism is mounted on the front non-reflecting surface and includes an incident light entry surface, intermediate reflecting surfaces, one of which is substantially coplanar with the front non-reflecting surface of the pentagonal roof prism, and a final reflecting surface arranged to reflect light directly through the front non-reflecting surface and the light exit surface of the pentagonal prism into, or adjacent, the field of view of an operator looking through the eyepiece. An optical system, including a reflecting element positioned substantially further away from the body tube of the taking lens of the camera than is the final reflecting surface of the sub-prism, reflects light from a photographic information indication on the body tube through the light entry surface of the sub-prism for internal reflection and final reflection to the eyepiece through the pentagonal prism. The reflecting means of the optical system is substantially universally adjustable.

7 Claims, 6 Drawing Figures

VIEWFINDER FOR A SINGLE LENS REFLEX CAMERA

FIELD AND BACKGROUND OF THE INVENTION

The present invention relates to a viewfinder for a single lens reflex camera, in which the light from a photographing information indication, provided on a lens bodytube, is incident upon the incident light entry surface of a sub-prism provided on a front non-reflecting surface of a pentagonal roof prism, and is reflected by a final reflecting surface of the sub-prism to direct the light through the pentagonal prism, so that an image of the photographing information indication is provided within the field of vision of the viewfinder.

This kind of view finder has already been disclosed in the specification of U.S. Pat. No. 3,094,911. However, the viewfinder disclosed in U.S. Pat. No. 3,094,911 has a sub-prism, provided at front non-reflecting surface of a pentagonal roof prism which conspicuously protrudes, presenting an awkward appearance.

Also, since interchangeable objective lenses of large lens diameter are used recently, the sub-prism has become an obstacle for a lens barrel. To avoid the same, the sub-prism may be fixedly provided at the upper portion of the non-reflecting surface, but, in this case, there will result such a shortcoming that the image of the indication formed at greatly distant position from a focussing screen within the finder field of vision, making the image of the indication hard to be viewed.

SUMMARY OF THE INVENTION

The object of the present invention lies in providing a viewfinder in which this shortcoming is eliminated and the invention is particularly characterized in that the extent of projection of the sub-prism at a portion close to the optical axis of the objective lens is small.

This object is achieved by having the light from a reflecting surface, provided at a comparatively higher position, for example, at a position higher than the final reflecting surface of the sub-prism, incident into the incident light entry surface or plane of the sub-prism provided on the lower portion of a front non-reflecting surface of the pentagonal prism, that is, by making the protruding portion distant from the optical axis of the objective lens.

Also, for making the sub-prism even smaller, the final reflecting surface may be so provided that its angle relative to the optical axis of the objective lens is small. When this angle is made small, the light incident upon the final reflecting surface needs to be incident from the rear of this reflecting surface. For that end, a further reflecting surface is needed between the reflecting surface facing the above mentioned indication and the final reflecting surface of the sub-prism, and this further reflecting surface needs to be positioned nearer the pentagonal prism than does the final reflecting surface.

Therefore, since the final reflecting surface of the sub-prism, in a view finder according to the present invention, is in upright position relative to the optical axis of the objective lens, the size of the sub-prism itself becomes small and, since the reflecting surface facing the indication material is at a high position, an objective lens with a bodytube having a large diameter can also be mounted.

For an understanding of the principles of the invention, reference is made to the following description of typical embodiments thereof as illustrated in the accompanying drawings.

DESCRIPTION OF THE PREFERRED EMBODIMENTS

Figure 1:
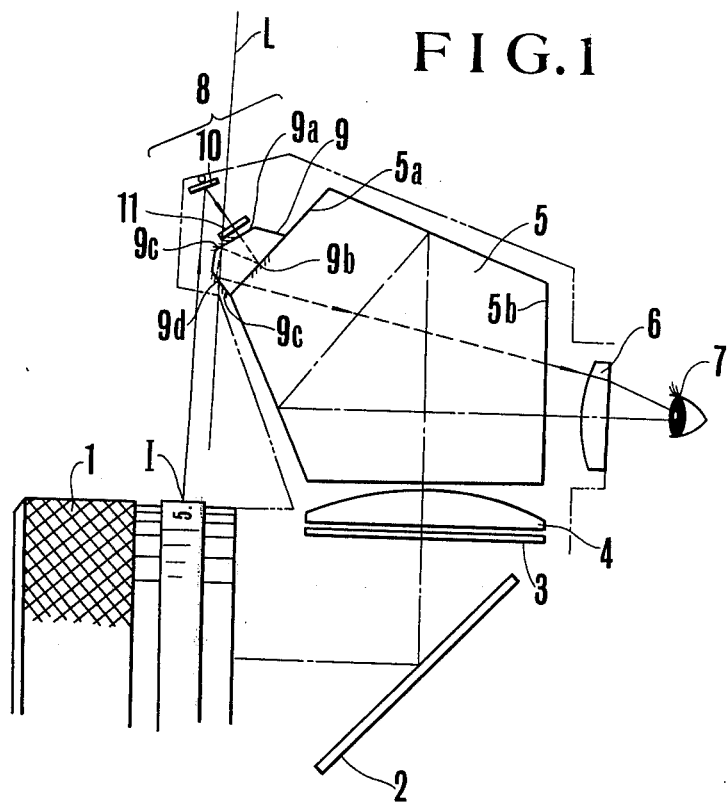
FIG. 1 is a side elevation view of a first embodiment of the present invention.

In the drawings, 1 is a lens bodytube, 2 is a mirror, 3 is a focussing plate, 4 is a condensor lens, 5 is a pentagonal prism, 6 is an eye-piece and 7 is a pupil of an observer. I is an information indication on the lens bodytube. Also 8 is an auxiliary optical means. 9 is a sub-prism attached to a front non-reflecting surface 5a of the penta-prism 5. 10 is a mirror which can have its position varied and is adjusted by a mechanism not shown in the drawing, and is useful for directing an information light from any given direction into the small size prism 9 with the same angle of incidence, by a swing movement or a parallel shifting. This mirror 10 is provided at a position higher than the final reflecting surface 9d of the sub-prism, that is, at a position quite far from the optical axis of the objective lens. Therefore the intermediate reflecting surfaces 9b, 9c of the sub-prism 9 are positioned at the right hand side, as viewed in FIG. 1, of the final reflecting surface 9d. 11 is a concave lens to enlarge the field of vision, positioned within the optical path of the information light, and another lens may be inserted to match the visibility.

The information light from the information indication I on the lens bodytube 1 passes through the concave lens 11 after being reflected at the mirror 10, is incident into the sub-prism 9, and, after being reflected three times within sub-prism 9, is incident into the pentagonal prism 5 through its front non-reflecting surface 5a. This information light exits through the light exit surface 5b without being reflected within the pentagonal prism 5, and proceeds to the pupil 7 of an observer through an eye-piece 6. In this case, as an optical path within the sub-prism 9, the information light entering through the incident light entry surface 9a of the sub-prism 9 from the upper direction or front direction is reflected at an intermediate reflecting surface 9b at the pentagonal prism 5 side of the sub-prism and is again intermediate reflected at the reflecting surface 9c which is in the same plane as the incident light entry surface 9a, and is further reflected at the final reflecting surface 9d, and then is incident into the pentagonal prism 5 from a jointing plane 9e between the sub-prism 9 and the pentagonal prism 5. In this case the light incident upon final reflecting surface 9d is incident from a direction substantially perpendicular to the optical axis of the objective lens and from the right hand direction relative to the line L. While the number of reflections within the sub-prism is larger than that in the above mentioned prior art, as the incident light entry surface 9a and the intermediate reflecting surface 9c constituted by the same surface, it helps to make the prism compact.

Further, as the position at which the adjustable mirror 10 is placed is at an upper position above the sub-prism 9 and the information light is introduced without any protrusion to the front, there will be no obstacle for exchange of objective lenses.

In the described example, when the information on a lens barrel is made to appear near, within, or immediately outside of the photographic field of vision, through the auxiliary optical means 8 including at least two optical elements each having a reflecting surface, the optical path of the information light, from the first reflecting surface to the final reflecting surface directing the light to the eyepiece, includes at least four, or even a larger even number of, changes in direction by reflection, and thus; is a detouring route. Therefore, any protrusion into the front direction of a camera becomes small and, at the same time, even when the information indicating position on the lens bodytube is extremely close to a camera main body, the information can be made to appear. That is, by providing the detouring route, the inclination of the luminous ray proceeding from the mirror 10 in FIG. 1 to the sub-prism 9 becomes small, and even when the information is indicated at a position close to the camera main body, the information light can be smoothly reflected at the mirror 10 and directed toward the sub-prism 9 without being obstructed by the sub-prism 9. At the same time, the position of the variable mirror 10 may be very close to the sub-prism 9.

Figure 2:
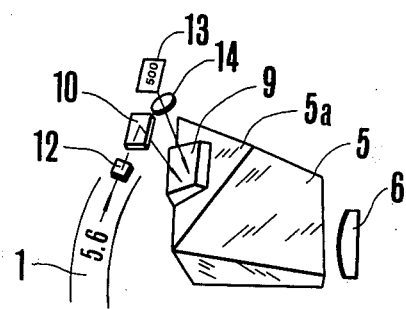
FIG. 2 is an oblique view illustrating the modification of the invention.
Figure 3:
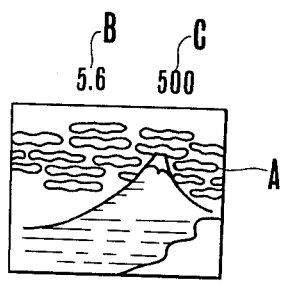
FIG. 3 is a pictorial elevation view of the field of vision using the viewfinder of the invention.

FIG. 2 illustrates the manner in which the information light from another information source is simultaneously introduced into the finder system shown in FIG. 1, and in FIG. 2, 13 is another information indication mark, and 14 is a lens for matching the visibility to be inserted as desired, while the other numbers therein indicate parts similar to those in FIG. 1. 12 is a lens which serves a function similar to that of the lens 11 of FIG. 1. The information indication mark 13 is illuminated by the luminous flux from the window of a prism housing which is not shown in the drawing, wherein the information light is incident into the sub-prism 9 after passing through the lens 14. Then, after being reflected three times within the sub-prism 9, the light is incident into the pentagonal prism 5, and proceeds to an observer through the eye-piece 6. FIG. 3 shows the appearance of the view within the finder, wherein the information mark I appears as 13 near the photographing field of vision A while the information mark 13 appears as C.

Figure 4:
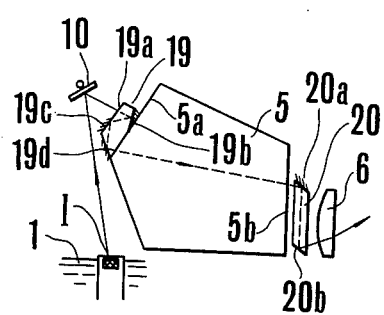
FIGS. 4, 5, and 6 are side elevation views of further embodiments of the invention.

FIG. 4 shows another example. In this figure, 19 is a modified prism positioned at the front upper non-reflecting surface 5a of the pentagonal prism 5. 20 is a parallel prism, provided between the light exit surface 5b and the eye-piece 6.

The information light from the information indication material I, indicated on the lens bodytube 1 is reflected at the mirror 10, and is incident upon the incident light entry surface 19a of the modified prism 19. Then, after being reflected in turn at the intermediate reflecting surfaces 19b, 19c and the final reflecting surface 19d, the light is incident into the pentagonal prism 5 through the front upper surface thereof to pass through the inside of the pentagonal prism, but it will not proceed directly to the eye-piece. Instead it is incident into the parallel prism 20. Within the parallel prism 20, the information light is reflected at the reflecting surfaces 20a and 20b in turn and proceeds to the eye-piece 6.

While the information indication appears at central lower portion of the photographing field of vision by inserting parallel prism 20, the information appearance is made possible without the angle of inclination of the optical path from the modified prism 19 to the direction of the eye-piece 6 receiving much restriction.

Figure 5:
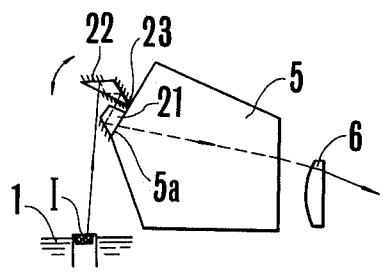

FIG. 5 shows another example. In this figure, 21 is a sub-prism positioned on the front upper surface 5a of the pentagonal prism. 22 is a position variable prism, which swings, for example, around the axis 23, by a mechanism not shown in the drawing, to help reading of the information shown at any desired position.

The information light from the information mark I on the lens bodytube 1 is incident into prism 22 and, after being reflected three times within this prism, comes out of the same, then is reflected once within a sub-prism 21 and, after passing through the inside of the pentagonal prism 5, is incident into the eye-piece 6, thus making an appearance at the central upper portion of the photographing field of vision.

Figure 6:
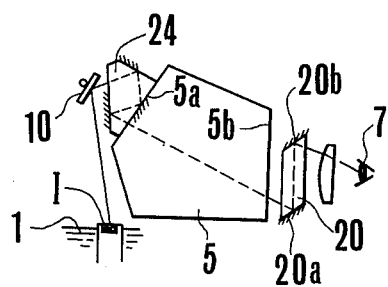

FIG. 6 shows still another example. 24 is a prism positioned on the front upper surface 5a of the pentagonal prism. The information light from the information mark I on the lens bodytube 1 is incident into prism 24 after being reflected by the position variation mirror 10, then is incident into the pentagonal prism 5 after being reflected three times within the prism 24. The information light will not take an optical path directly proceeding to the pupil 7. Instead, after being reflected in turn at the reflecting surfaces 20a, 20b within the parallel prism 20 it is incident into the eye-piece 6. Since the present invention has a plural number of optical elements independent from each other, as auxiliary optical means as has been described above, the invention has the following effects:

First, as at least one of the optical elements is made independent, it can be moved so that the information mark at different positions on the lens bodytube can be selectively read out. Secondly, as the auxiliary optical means is so made as to be separated from the plural number of optical elements, the optical elements can be moved as mutually independent parts. Thus any manufacturing error in the pentagonal prism or sub-prisms can be absorbed to a certain extent by adjusting other optical elements, so that manufacturing cost can be easily reduced.

Thirdly, as the first optical element facing the information indication material is provided at a comparatively high position, the directly reflected light of the lens bodytube is hard to enter, so that only thus the information mark part appears within the finder.

Fourthly, because of the same arrangement as in the third effect mentioned above, even if the information indication position is far towards the front from the camera main body, the shinkage of the view of the vertical length of the information mark can be small. Also, even when the information indication position is varied, the difference in visibility in the finder can be made small, so that the information within the finder can be made easy to be viewed.

By making the optical path up to the finder prism detouring, various information, at any given position up to a position close to the camera mainbody on the lens barrel, can be indicated near the finder photographing field of vision without obstructing the exchange of lens, so that this is very useful invention.

While specific embodiments of the invention have been shown and described in detail to illustrate the application of the principles of the invention, it will be understood that the invention may be embodied otherwise without departing from such principles.

What is claimed is:

1. A viewfinder for a single lens reflex camera having an object lens, a lens barrel containing the object lens, and photograhic information provided on the lens barrel, said viewfinder comprising, in combination, a focusing screen on which an object image is formed by said object lens; an eye piece; a pentagonal roof prism directing light from said focusing screen toward said eye piece; said pentagonal roof prism having an incident light entry surface on which light from said focusing screen is incident, two roof reflection surfaces, a front reflection surface, a front non-reflection surface and a light projection surface opposite said eye piece; a sub-prism having an incident light entry surface, a plurality of intermediate reflection surfaces, a final reflection surface and a light projection surface; said light projection surface of said sub-prism being cemented to said front non-reflection surface and said final reflection surface of said sub-prism being positioned outwardly of said intermediate reflection surfaces; and optical means positioned above said final reflection surface of said sub-prism and having a reflecting surface facing said photographic information on said lens barrel and said incident light entry surface of said sub-prism; whereby light from said photographic information is reflected by the reflecting surface of said optical means and directed into said sub-prism through said incident light entry surface of said sub-prism, the light being then reflected by said intermediates reflection surfaces of said sub-prism and directed into said pentagonal prism through said light-projection surface of said sub-prism by said final reflection surface of said sub-prism to pass through said pentagonal prism and through said light projection surface thereof to said eye piece.

2. A viewfinder for a single lens reflex camera, as claimed in claim 1, in which said optical means is a mirror.

3. A viewfinder for a single lens reflex camera, as claimed in claim 2, in which said mirror is angularly adjustable.

4. A viewfinder for a single lens reflex camera, as claimed in claim 2, including a lens positioned in the path of light rays between said photographic information and the incident light entry surface of said sub-prism.

5. A viewfinder for a single lens reflex camera, having an object lens, a lens barrel containing said object lens, and photographic information provided on said lens barrel, said viewfinder comprising, in combination, a focusing screen on which an object image is formed by said object lens; an eyepiece; a pentagonal prism for directing light from said focusing screen toward said eyepiece; said pentagonal prism having an incident light entry surface on which light from said focusing screen is incident, two roof surfaces, a front reflection surface, a front non-reflection surface and a light projection surface opposite said eye piece; a sub-prism having an incident light entry surface, a final reflection surface, and a light-projection surface, said light-projection surface of said sub-prism being cemented to said front non-reflection surface of said pentagonal prism; and a prism block positioned above said final reflection surface of said sub-prism and having a first incident light surface, an intermediate surface and a projection surface, said first incident light surface facing said photographic information on said lens barrel; whereby light from said photographic information passes through said projection surface of said prism block and the incident light entry surface of said sub-prism, is reflected by said intermediate reflection surface of said sub-prism to be incident on said final reflection surface of said sub-prism inside said sub-prism for reflection through said projection surface of said sub-prism and through said pentagonal prism to be directed through said projection surface of said pentagonal prism to said eye piece.

6. A viewfinder for a single lens reflex camera, as claimed in claim 5, in which said prism block is rotatable about an axis.

7. A viewfinder for a single lens reflex camera having an object lens, a lens barrel containing said object lens, and photographic information provided on said lens barrel, said viewfinder comprising, in combination, a focusing screen on which an object image is formed by said object lens; an eyepiece; a pentagonal roof prism for directing light from said focusing screen toward said eye piece; said pentagonal prism having an incident light entry surface on which light from said focusing screen is incident, two roof surfaces, a front reflection surface, a front non-reflection surface and a light projection surface opposite said eye piece; a sub-prism having an incident light entry surface, a final reflection surface, and a projection surface, said projection surface of said sub-prism being cemented to said front non-reflection surface of said pentagonal prism; a reflection mirror positioned above said final reflection surface of said sub-prism and facing said photographic information; and a plurality of intermediate reflection surfaces in said sub-prism including a first intermediate reflection surface and a second intermediate reflection surface, said first intermediate reflection surface facing said reflection mirror and said second intermediate reflection surface directing light to said final reflection surface of said sub-prism and being positioned inwardly relative to said final reflection surface of said sub-prism; whereby light from said photographic information is reflected by said reflection mirror into said sub-prism through the incident light entry surface thereof, reflected by said intermediate reflection surfaces, and directed by said final reflection surface into said pentagonal prism and through said projection surface of said pentagonal prism to said eye piece.

* * * * *